(12) United States Patent
Naka

(10) Patent No.: US 10,692,658 B2
(45) Date of Patent: Jun. 23, 2020

(54) PHOTOELECTRIC CONVERSION ELEMENT

(71) Applicant: FUJIKURA LTD., Tokyo (JP)

(72) Inventor: Keisuke Naka, Chiba (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 104 days.

(21) Appl. No.: 15/533,246

(22) PCT Filed: Feb. 4, 2016

(86) PCT No.: PCT/JP2016/053317
§ 371 (c)(1),
(2) Date: Jun. 5, 2017

(87) PCT Pub. No.: WO2016/125846
PCT Pub. Date: Aug. 11, 2016

(65) Prior Publication Data
US 2019/0088418 A1 Mar. 21, 2019

(30) Foreign Application Priority Data

Feb. 4, 2015 (JP) ................................ 2015-020207
Feb. 4, 2015 (JP) ................................ 2015-020208

(51) Int. Cl.
*H01G 9/20* (2006.01)
(52) U.S. Cl.
CPC ......... *H01G 9/2077* (2013.01); *H01G 9/2027* (2013.01); *H01G 9/2009* (2013.01);
(Continued)
(58) Field of Classification Search
CPC combination set(s) only.
See application file for complete search history.

(56) References Cited

U.S. PATENT DOCUMENTS

2005/0257826 A1* 11/2005 Yamanaka ........... H01G 9/2081
136/263
2008/0308155 A1* 12/2008 Fukui ................... H01G 9/2031
136/261
(Continued)

FOREIGN PATENT DOCUMENTS

EP 2 352 200 A1 8/2011
EP 2 631 988 A1 8/2013
(Continued)

OTHER PUBLICATIONS

Communication dated Mar. 12, 2018 from the European Patent Office in counterpart application No. 16746677.0.
(Continued)

*Primary Examiner* — Daniel P Malley, Jr.
(74) *Attorney, Agent, or Firm* — Sughrue Mion, PLLC

(57) ABSTRACT

Disclosed is a photoelectric conversion element including a cell. The cell includes an electrode substrate, a counter substrate, an oxide semiconductor layer provided on the electrode substrate, an electrolyte provided between the electrode substrate and the counter substrate, and an annular sealing portion joining the electrode substrate and the counter substrate. The layer includes a main body portion provided inside the sealing portion and on the electrode substrate and extending straight from the electrode substrate toward the counter substrate, and a protruding portion which protrudes from the main body portion toward the sealing portion and does not come into contact with the electrode substrate. A width of a second surface of the layer facing the counter substrate is longer than a width of a first surface which is a boundary surface between the layer and the electrode substrate in a cross section along a thickness direction of the layer.

9 Claims, 4 Drawing Sheets

(52) U.S. Cl.
CPC ......... *H01G 9/2013* (2013.01); *H01G 9/2018* (2013.01); *H01G 9/2031* (2013.01); *H01G 9/2059* (2013.01); *Y02E 10/542* (2013.01)

(56) References Cited

U.S. PATENT DOCUMENTS

| | | | |
|---|---|---|---|
| 2011/0073177 A1* | 3/2011 | Osawa | H01G 9/2027 136/256 |
| 2011/0315212 A1 | 12/2011 | Hayase et al. | |
| 2012/0118379 A1 | 5/2012 | Inoue et al. | |
| 2014/0000678 A1* | 1/2014 | Shimohira | H01G 9/2077 136/244 |
| 2014/0326297 A1 | 11/2014 | Char et al. | |

FOREIGN PATENT DOCUMENTS

| | | | | |
|---|---|---|---|---|
| EP | 2631988 A1 * | 8/2013 | ........... | H01G 9/2081 |
| JP | 2013-143334 A | 7/2013 | | |
| JP | 5320405 B2 | 10/2013 | | |
| WO | 2011/040102 A1 | 4/2011 | | |
| WO | 2012/053763 A2 | 4/2012 | | |

OTHER PUBLICATIONS

International Search Report for PCT/JP2016/053317, dated Mar. 8, 2016 (PCT/ISA/210).

* cited by examiner

PHOTOELECTRIC CONVERSION ELEMENT

CROSS REFERENCE TO RELATED APPLICATIONS

This application is a National Stage of International Application No. PCT/JP2016/053317 filed Feb. 4, 2016, claiming priority based on Japanese Patent Application No. 2015-020207, filed Feb. 4, 2015, and Japanese Patent Application No. 2015-020208, filed Feb. 4, 2015, the contents of all of which are incorporated herein by reference in their entirety.

TECHNICAL FIELD

The present invention relates to a photoelectric conversion element.

BACKGROUND ART

A dye-sensitized solar cell was developed by Gratzel at al. of Switzerland, and is a next-generation photoelectric conversion element attracting attention due to advantages such as high photoelectric conversion efficiency and low manufacturing cost.

In general, a photoelectric conversion element using a dye such as the dye-sensitized solar cell includes at least one photoelectric conversion cell, and the photoelectric conversion cell includes an electrode substrate, a counter substrate facing the electrode substrate, an oxide semiconductor layer provided on the electrode substrate, an electrolyte provided between the electrode substrate and the counter substrate, and an annular sealing portion joining the electrode substrate and the counter substrate together.

For example, a dye-sensitized solar cell described in Patent Document 1 below is known as the photoelectric conversion element. In this dye-sensitized solar cell, a sealing portion includes an inorganic sealing portion fixed to a transparent electrode serving as an electrode substrate and made of an inorganic material an resin sealing portion which joins the inorganic sealing portion and a counter electrode serving as a counter substrate and is made of a resin material, and the inorganic sealing portion protrudes inward from the resin sealing portion. In addition, in Patent Document 1, an oxide semiconductor layer extends straight from the transparent electrode toward the counter electrode.

CITATION LIST

Patent Document

Patent Document 1: JP 5320405 B1 (FIG. 1)

SUMMARY OF THE INVENTION

Problem to be Solved by the Invention

However, the dye-sensitized solar cell described in Patent Document 1 has the following problems.

That is, the dye-sensitized solar cell described in Patent Document 1 has room for improvement in terms improvement in photoelectric conversion characteristics.

The invention has been made in view of the above circumstances, and an object thereof is to provide a photoelectric conversion element capable of improving photoelectric conversion characteristics.

Means for Solving Problem

The inventor has made extensive studies in order to solve the above-mentioned problems, and found that the above-mentioned problems can be solved by the following inventions.

Namely, the invention includes at least one photoelectric conversion cell, the photoelectric conversion cell includes an electrode substrate, a counter substrate facing the electrode substrate, an oxide semiconductor layer provided on the electrode substrate, an electrolyte provided between the electrode substrate and the counter substrate, and an annular sealing portion joining the electrode substrate and the counter substrate together, the oxide semiconductor layer includes a main body portion provided inside, the sealing portion and on the electrode substrate and extending straight from the electrode substrate toward the counter substrate, and a protruding portion which protrudes from the main body portion toward the sealing portion and does not come into contact with the electrode substrate, and a width of a second surface of the oxide semiconductor layer facing the counter substrate is longer than a width of a first surface which is a boundary surface between the oxide semiconductor layer and the electrode substrate in a cross section along a thickness direction of the oxide semiconductor layer.

In the photoelectric conversion element of the invention, in a case in which the oxide semiconductor layer does not have the protruding portion which protrudes toward the sealing portion from the main body portion, and the width of the second surface of the oxide semiconductor layer facing the counter substrate is not longer than the width of the first surface which is the boundary surface between the oxide semiconductor layer and the electrode substrate in the cross section along the thickness direction of the oxide semiconductor layer, when light is obliquely incident on a surface of the electrode substrate on an opposite side from the counter substrate or when light is refracted by the electrode substrate or the like, light is obliquely incident on a boundary surface between the main body portion and the electrode substrate, and light passing through the main body portion may not be absorbed by the oxide semiconductor layer. In contrast, in a case in which the oxide semiconductor layer has the protruding portion which protrudes from the main body portion toward the sealing portion and does not come into contact with the electrode substrate, and the width of the second surface of the oxide semiconductor layer facing the counter substrate is longer than the width of the first surface which is the boundary surface between the oxide semiconductor layer and the electrode substrate in the cross section along the thickness direction of the oxide semiconductor layer, even when light is obliquely incident on the first surface which is the boundary surface between the oxide semiconductor layer and the electrode substrate and passes through the main body portion, the light may be incident on the protruding portion and absorbed by the protruding portion. As a result, utilization efficiency of light is increased, and a photoelectric conversion characteristic of the photoelectric conversion element can be improved.

In the photoelectric conversion element, Y represented by the following formula (1) is preferably in a range of 2 to 25:

$$Y = (X2 - X1)/2d \quad (1)$$

(In the above formula (1), X1 denotes the width (unit is μm) of the first surface, X2 denotes the width (unit is μm) of the second surface, and d denotes a thickness (unit is μm) of the oxide semiconductor layer in the main body portion.)

In this case, the photoelectric conversion characteristic of the photoelectric conversion element can be further improved compared to a case in which Y is out of the range.

In the photoelectric conversion element, the protruding portion preferably has a tapered shape tapering away from the main body portion in the cross section along the thickness direction of the oxide semiconductor layer.

According to the photoelectric conversion element of the invention, the protruding portion has a tapered shape tapering away from the main body portion in the cross section along the thickness direction of the oxide semiconductor layer. For this reason, even when light is obliquely incident on the surface of the electrode substrate and in a direction away from the main body portion around a boundary line between the sealing portion and the main body portion of the oxide semiconductor layer on the surface of the electrode substrate, the light can be received in the protruding portion which is part of the oxide semiconductor layer. As a result, utilization efficiency of light is increased, and the photoelectric conversion characteristic of the photoelectric conversion element can be further improved.

Further, the fact that the protruding portion has the tapered shape tapering away from the main body portion means that the protruding portion becomes thicker from a tip thereof toward the main body portion. For this reason, strength of the protruding portion is further improved compared to a case in which the protruding portion maintains a thin state in the direction away from the main body portion. Even when a temperature around the photoelectric conversion element is changed, and thus the sealing portion repeatedly expands or contracts and comes into contact with the protruding portion, a crack or the like is not likely to occur in the protruding portion, and thus the photoelectric conversion element can have more excellent durability.

In the photoelectric conversion element, it preferable that the sealing portion include an annular first sealing portion provided on the electrode substrate, and an annular second sealing portion joining the first sealing portion and the counter substrate together, the first sealing portion includes an adhesive portion adhered to the second sealing portion and a non-adhesive portion which is not adhered to the second sealing portion and protrudes inward from the second sealing portion, and the protruding portion of the oxide semiconductor layer is provided between the counter substrate and the non-adhesive portion of the first sealing portion.

In the photoelectric conversion element, in a case in which the oxide semiconductor layer does not have the protruding portion protruding from the main body portion toward the sealing portion, when light is obliquely incident on the surface of the electrode substrate on the opposite side from the counter substrate or when light is refracted by the electrode substrate or the like, light is obliquely incident on the boundary surface between the main body portion and the electrode substrate, light passing through the main body portion is absorbed by the second sealing portion or the like, and such light cannot be absorbed by the oxide semiconductor layer. In contrast, in a case in which the oxide semiconductor layer has the protruding portion protruding from the main body portion toward the sealing portion, even when light is obliquely incident on the boundary surface between the main body portion and the electrode substrate and passes through the main body portion, the light can be incident on the protruding portion and absorbed by the protruding portion. As a result, utilization efficiency of light is increased, and the photoelectric conversion characteristic of the photoelectric conversion element can be further improved. Furthermore, since in the photoelectric conversion element, the protruding portion of the oxide semiconductor layer is provided between the counter substrate and the non-adhesive portion of the first sealing portion, for example, even when the counter substrate bends and pushes the protruding portion toward the electrode substrate, the protruding portion is supported by the non-adhesive portion of the first sealing portion. For this reason, it is possible to enhance stability of the protruding portion of the oxide semiconductor layer.

In the photoelectric conversion element, the protruding portion of the oxide semiconductor layer is preferably provided to run on the non-adhesive portion of the first sealing portion.

In this case, for example, even when the counter substrate bends and pushes the protruding portion toward the electrode substrate, the protruding portion of the oxide semiconductor layer is supported by the non-adhesive portion of the first sealing portion. At this time, the protruding portion of the oxide semiconductor layer is provided to run on the non-adhesive portion of the first sealing portion. For this reason, it is possible to enhance stability of the protruding portion of the oxide semiconductor layer. In addition, it is possible to absorb light incident at an acute angle on the surface of the electrode substrate on the opposite side from the counter substrate.

In the photoelectric conversion element, the non adhesive portion of the first sealing portion may have a tapered shape tapering from the adhesive portion toward the oxide semiconductor layer in a cross section along a thickness direction of the first sealing portion.

In the photoelectric conversion element, the non-adhesive portion of the first sealing portion and the main body portion of the oxide semiconductor layer preferably come into contact with each other over a whole circumference of the main body portion on the surface of the electrode substrate.

In this case, a gap between the main body portion of the oxide semiconductor layer and the first sealing portion is eliminated on the surface of the electrode substrate. For this reason, it is possible to further increase the amount of light incident on the oxide semiconductor layer, and to further improve the photoelectric conversion characteristic of the photoelectric conversion element.

In the photoelectric conversion element, a depression is preferably formed on a side of the oxide semiconductor layer facing the counter substrate.

When the depression is formed on the side of the oxide semiconductor layer facing the counter substrate, a surface area of a surface of the oxide semiconductor layer facing the counter substrate increases more compared to a case in which the depression is not formed. As a result, it is possible to capture more light which enters from the electrode substrate, passes through the oxide semiconductor layer, and is reflected on the counter substrate, and to further improve the photoelectric conversion characteristic of the photoelectric conversion element.

In the photoelectric conversion element, when the depression is formed on the side of the oxide semiconductor layer facing the counter substrate, a maximum depth of the depression is preferably in a range of 1 to 50 µm.

In this case, it is possible to increase utilization efficiency of light while shortening an inter-electrode distance (a distance between the electrode substrate and the counter substrate) compared to a case in which the maximum depth of the depression is out of the range. For this reason, the photoelectric conversion characteristic of the photoelectric conversion element can be further improved.

In the photoelectric conversion element, the counter substrate preferably includes an electrode.

In this case, even when a gap is present between the first sealing portion and the oxide semiconductor layer on the surface of the electrode substrate, the counter substrate including the electrode can be prevented from coming into contact with the electrode substrate facing the counter substrate by the protruding portion of the oxide semiconductor layer, and a short circuit between the counter substrate and the electrode substrate can be prevented.

In the photoelectric conversion element, the annular sealing portion is preferably provided to surround the oxide semiconductor layer.

In the present invention, the "second surface" refers to a surface obtained by projecting the surface of the oxide semiconductor layer facing the counter substrate on a flat surface orthogonal to the thickness direction of the oxide semiconductor layer, that is, a surface in a case in which the surface of the oxide semiconductor layer facing the counter substrate is viewed in the thickness direction of the oxide semiconductor layer.

In the present invention, the "thickness direction of the oxide semiconductor layer" refers to a direction orthogonal to the boundary surface between the electrode substrate and the oxide semiconductor layer.

In the present invention, the "thickness direction of the first sealing portion" refers to a direction orthogonal to the boundary surface between the electrode substrate and the first sealing portion.

In the present invention, the "maximum depth of the depression" refers to a distance between a position closest to the counter substrate and a position farthest from the counter substrate.

Effect of the Invention

According to the present invention, a photoelectric conversion element capable of improving photoelectric conversion characteristics is provided.

MODE(S) FOR CARRYING OUT THE INVENTION

Figure 1:
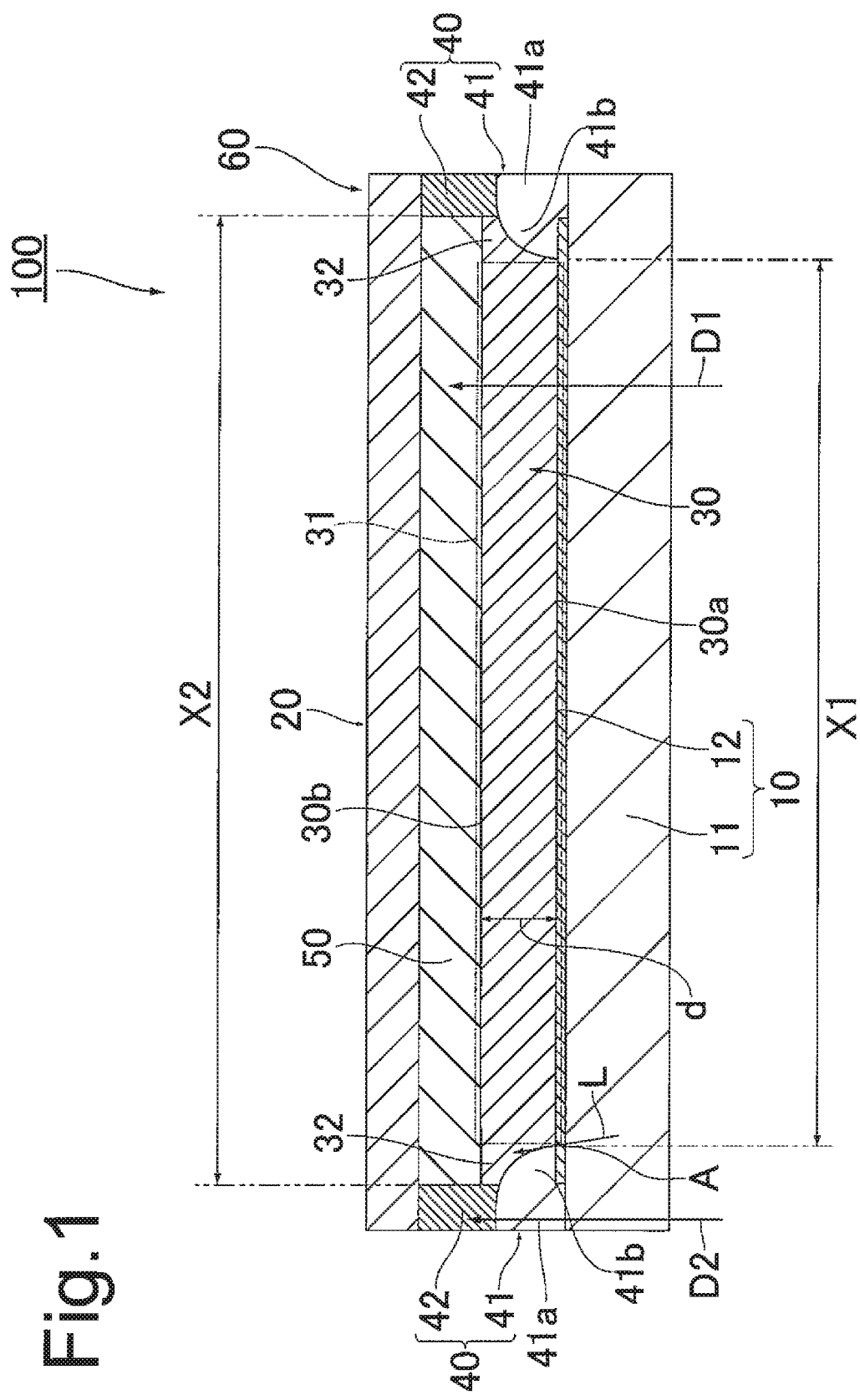
FIG. 1 is a cross-sectional view illustrating a first embodiment of a photoelectric conversion element of the present invention.

Hereinafter, an embodiment of the invention will be described in detail with reference to FIG. 1 and FIG. 2. FIG. 1 is a cross-sectional view illustrating a first embodiment of a photoelectric conversion element of the present invention, and FIG. 2 is a partial cross-sectional view illustrating a counter substrate of FIG. 1.

Figure 2:
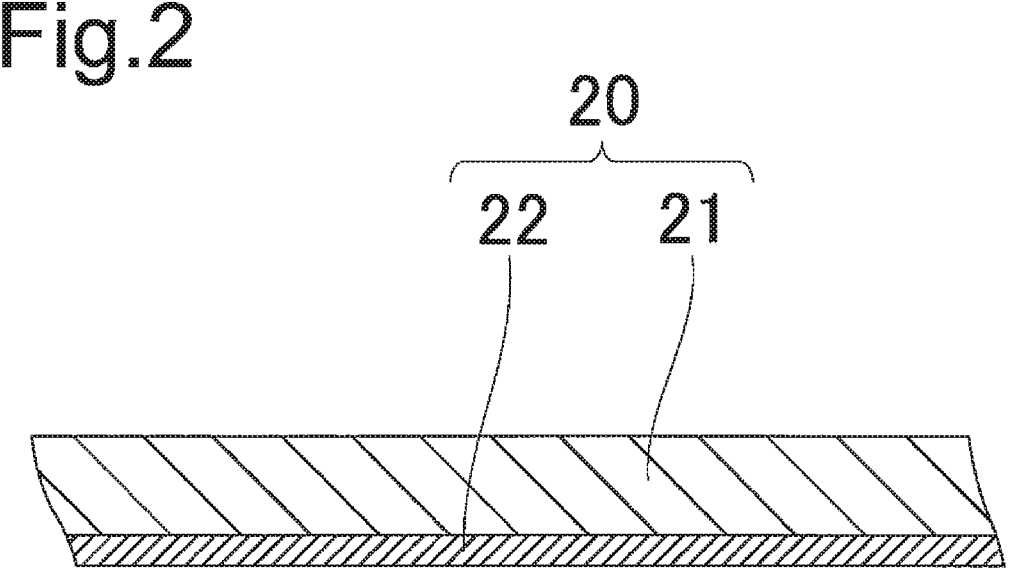
FIG. 2 is a partial cross-sectional view illustrating a counter substrate of FIG. 1.

As illustrated in FIG. 1 and FIG. 2, a photoelectric conversion element 100 includes one photoelectric conversion cell 60, and the photoelectric conversion cell 60 includes an electrode substrate 10, a counter substrate 20 facing the electrode substrate 10, an oxide semiconductor layer 30 provided or the electrode substrate 10, an electrolyte 50 provided between the electrode substrate 10 and the counter substrate 20, and an annular sealing portion 40 joining the electrode substrate 10 and the counter substrate 20 together. The electrolyte 50 is filled in a cell space formed by the electrode substrate 10, the counter substrate 20 and the sealing portion 40.

The electrode substrate 10 includes a transparent substrate 11 and a transparent conductive layer 12 serving as an electrode provided on the transparent substrate 11. Here, a peripheral portion of the transparent conductive layer 12 is interposed between the sealing portion 40 and the transparent substrate 11. In addition, part of the transparent conductive layer 12 extends to an outside of the annular sealing portion 40, and the portion extending to the outside of the sealing portion 40 functions as a power extraction portion for extracting power.

The sealing portion 40 is provided to surround the oxide semiconductor layer 30, and includes an annular first sealing portion 41 provided on the electrode substrate 10 and an annular second sealing portion 42 joining the first sealing portion 41 and the counter substrate 20 together. The first sealing portion 41 includes an annular adhesive portion 41a adhered to the second sealing portion 42 and an annular non-adhesive portion 41b which is not adhered to the second sealing portion 42 and protrudes inward from the second sealing portion 42. The non-adhesive portion 41b has a tapered shape that tapers inward (that is, toward the oxide semiconductor layer 30) from the annular adhesive portion 41a in a cross section along a thickness direction thereof, that is, a thickness direction D2 of the first sealing portion 41. Specifically, a thickness of the non-adhesive portion 41b from the electrode substrate 10 decreases toward an inside from the adhesive portion 41a.

As illustrated in FIG. 2, the counter substrate 20 includes a conductive substrate 21 serving as both a substrate and a second electrode, and a catalyst layer 22 which is provided on the side of the conductive substrate 21 facing the electrode substrate 10 and contributes to reduction of the electrolyte 50. That is, in the present embodiment, the counter substrate 20 constitutes an electrode substrate having an electrode.

The oxide semiconductor layer 30 includes a main body portion 31 provided inside the first sealing portion 41 and on the electrode substrate 10, and a protruding portion 32 which protrudes toward the sealing portion 40 from the main body portion 31 and is provided between the counter 20 and the non-adhesive portion 41b of the first sealing portion 41. Here, the main body portion 31 is indicated by a two-dot chain line in FIG. 1 and extends straight from the electrode substrate 10 toward the counter substrate 20. Specifically, the main body portion 31 extends straight along a direction perpendicular to a surface of the electrode substrate 10, that is, a thickness direction D1 of the oxide semiconductor layer 30. On the other hand, the protruding portion 32 has a tapered shape that tapers away from the main body portion 31 in a cross section along the thickness direction D1 of the oxide semiconductor layer 30. That is, in the oxide semiconductor layer 30, in the cross section along the thickness direction D1 of the oxide semiconductor layer 30, a width X2 of a second surface 30b of the oxide semiconductor layer 30 facing the counter substrate 20 is longer than a width X1 of a first surface 30a which is a boundary surface between the oxide semiconductor layer 30 and the electrode substrate 10. Here, the protruding portion 32 is not in contact with the electrode substrate 10. In addition, the protruding portion 32 is provided between the counter substrate 20 and the non-adhesive portion 41b of the first sealing portion 41. More specifically, the protruding portion 32 is provided to run on the non-adhesive portion 41b of the first sealing portion 41. In addition, in the oxide semiconductor layer 30, on a surface of the transparent conductive layer 12 of the electrode substrate 10, the non-adhesive portion 41b of the first sealing portion 41 and the main body portion 31 of the oxide semiconductor layer 30 come into contact with each other over a whole circumference of the main body portion 31. That is, on the surface of the transparent conductive layer 12 of the electrode substrate 10, any gap is not formed between the non-adhesive portion 41b of the first sealing portion 41 and the main body portion 31 of the oxide semiconductor layer 30. Further, a dye is adsorbed on the oxide semiconductor layer 30.

In the photoelectric conversion element 100, in a case in which the oxide semiconductor layer 30 does not have the protruding portion 32 which protrudes toward the sealing portion 40 from the main body portion 31, and the width X2 of the second surface 30b of the oxide semiconductor layer 30 facing the counter substrate 20 is not longer than the width X1 of the first surface 30a which is the boundary surface between the oxide semiconductor layer 30 and the electrode substrate 10 in the cross section along the thickness direction D1 of the oxide semiconductor layer 30, when light is obliquely incident on a surface of the electrode substrate 10 on an opposite side from the counter substrate 20 or when light is refracted by the electrode substrate 10 or the like, light is obliquely incident on a boundary surface between the main body portion 31 and the electrode substrate 10, light passing through the main body portion 31 is absorbed by the second sealing portion 32 or the like, and such light cannot be absorbed by the oxide semiconductor layer 30. In contrast, in a case in which the oxide semiconductor layer 30 has the protruding portion 32 which protrudes from the main body portion 31 toward the sealing portion 40 and does not come into contact with the electrode substrate 10, and the width X2 of the second surface 30b of the oxide semiconductor layer 30 facing the counter substrate 20 is longer than the width X1 of the first surface 30a which is the boundary surface between the oxide semiconductor layer 30 and the electrode substrate 10 in the cross section along the thickness direction D1 of the oxide semiconductor layer 30, even when light is obliquely incident on the boundary surface between the main body portion 31 and the electrode substrate 10 and passes through the main body portion 31, the light can be incident on the protruding portion 32 and absorbed by the protruding portion 32. As a result, utilization efficiency of light is increased, and a photoelectric conversion characteristic of the photoelectric conversion element 100 can be improved.

In particular, in a case in which the oxide semiconductor layer 30 does not have the protruding portion 32 which protrudes toward the sealing portion 40 from the main body portion 31, when the counter substrate 20 has light reflectivity, and when light enters from the electrode substrate 10, passes through the oxide semiconductor layer 30, and is reflected on the counter substrate 20, light of reflected light thereof directed to the non-adhesive portion 41b of the first sealing portion 41 is incident on the non-adhesive portion 41b of the first sealing portion 41 and emitted to the outside by passing through the electrode substrate 10 as it is. In contrast, in a case in which the oxide semiconductor layer 30 has the protruding portion 32 which protrudes toward the sealing portion 40 from the main body portion 31, even when light enters from the electrode substrate 10, passes through the oxide semiconductor layer 30, and is reflected on the counter substrate 20, light of reflected light thereof directed to the non-adhesive portion 41b of the first sealing portion 41 can be incident on the protruding portion 32 and absorbed by the protruding portion 32. As a result, utilization efficiency of light is increased, and the photoelectric conversion characteristic of the photoelectric conversion element 100 can be further improved.

In addition, when light is obliquely incident on the surface of the electrode substrate 10 on the opposite side from the counter substrate 20 or when light is refracted by the electrode substrate 10 or the like, the second sealing portion 42 may be deteriorate due to light when light enters the second sealing portion 42. In contrast, in the photoelectric conversion element 100, since light is absorbed by the protruding portion 32, light is not incident on the second sealing portion 42. For this reason, and thus durability of the photoelectric conversion element 100 is also improved.

Further, in the photoelectric conversion element 100, the protruding portion 32 the oxide semiconductor layer 30 has a tapered shape tapering away from the main body portion 31 in the cross section along the thickness direction D1 of the oxide semiconductor layer 30. For this reason, as illustrated in FIG. 1, on a surface of the electrode substrate 10, even when light is obliquely incident on the surface of the electrode substrate 10 and in a direction away from the main body portion 31 (a direction indicated by L in FIG. 1) around a boundary line A between the non-adhesive portion 41b of the first sealing portion 41 and the main body portion 31 of the oxide semiconductor layer 30, the light can be received by the protruding portion 32 which is part of the oxide semiconductor layer 30. As a result, utilization efficiency of light is enhanced, and photoelectric conversion efficiency of the photoelectric conversion element 1 an be further improved. Further, the fact that the protruding portion 32 has the tapered shape tapering away from the main body portion 31 means that the protruding portion 32 becomes thicker from a tip thereof toward the main body portion 31. For this reason, strength of the protruding portion 32 is further improved compared to a case in which the protruding portion 32 maintains a thin state in the direction away from the main body portion 31. Even when a temperature around the photoelectric conversion element 100 is changed, and thus the non-adhesive portion 41b repeatedly expands or contracts, a crack or the like is not likely to occur in the protruding portion 32, and thus the photoelectric conversion element 100 can have more excellent durability.

In addition, in the photoelectric conversion element 100, the protruding portion 32 of the oxide semiconductor layer 30 is provided to run on the non-adhesive portion 41b of the first sealing portion 41. For this reason, for example, even when the counter substrate 20 bends and pushes the protruding portion 32 toward the electrode substrate 10, the protruding portion 32 of the oxide semiconductor layer 30 is supported by the non-adhesive portion 41b of the first sealing portion 41. For this reason, it is possible to further enhance stability of the protruding portion 32 of the oxide semiconductor layer 30. In addition, according to the photoelectric conversion element 100, it is also possible to absorb light incident at an acute angle on the surface of the electrode substrate 10 on the opposite side from the counter substrate 20.

Further, according to the photoelectric conversion element 100, on the surface of the transparent conductive layer 12 of the electrode substrate 10, the non-adhesive portion 41b of the first sealing portion 41 and the main body portion 31 of the oxide semiconductor layer 30 come into contact with each other over the whole circumference of the main body portion 31. That is, on the surface of the transparent conductive layer 12 of the electrode substrate 10, any gap is not formed between the non-adhesive portion 41b of the first sealing portion 41 and the main body portion 31 of the oxide semiconductor layer 30. For this reason, it is possible to further increase the amount of light incident on the oxide semiconductor layer 30, and to further improve the photoelectric conversion characteristic of the photoelectric conversion element 100.

In addition, in the photoelectric conversion element 100, the counter substrate 20 constitutes the electrode substrate. For this reason, even when a gap is present between the first sealing portion 41 and the oxide semiconductor layer 30 on the surface of the electrode substrate 10, the counter substrate 20 which is the electrode substrate can be prevented from coming into contact with the electrode substrate 10 facing the counter substrate 20 by the protruding portion 32 of the oxide semiconductor layer 30, and a short circuit between the counter substrate 20 and the electrode substrate 10 can be prevented.

Next, a detailed description will be given of the electrode substrate 10, the counter substrate 20, the oxide semiconductor layer 30, the sealing portion 40, the electrolyte 50, and the dye.

<Electrode Substrate>

As described above, the electrode substrate 10 is constituted by the transparent substrate 11 and the transparent conductive layer 12 provided on the transparent substrate 11.

(Transparent Substrate)

The material constituting the transparent substrate 11 may be any transparent material, for example, and examples of such a transparent material may include glass such as borosilicate glass, soda lime glass, glass which is made of soda lime and whose iron component is less than that of ordinary soda lime glass, and quartz glass, polyethylene terephthalate (PET), polyethylene naphthalate (PEN), polycarbonate (PC), and polyethersulfone (PES). The thickness of the transparent substrate 11 is appropriately determined depending on the size of the photoelectric conversion element 100 and is not particularly limited, but it may be set into the range of from 50 to 40000 µm, for example.

(Transparent Conductive Layer)

Examples of the material constituting the transparent conductive layer 12 may include a conductive metal oxide such as indium-tin-oxide (ITO), tin oxide ($SnO_2$), and fluorine-doped-tin-oxide (FTO). The transparent conductive layer 12 may be constituted by a single layer or a laminate consisting of a plurality of layers constituted by different conductive metal oxides. It is preferable that the transparent conductive layer 12 contain FTO since FTO exhibits high heat resistance and chemical resistance in a case in which the transparent conductive layer 12 is constituted by a single layer. The thickness of the transparent conductive layer 12 may be set into the range of from 0.01 to 2 µm, for example.

<Counter Substrate>

As described above, the counter substrate 20 includes the conductive substrate 21 serving both as a substrate and a second electrode, and the conductive catalyst layer 22 which is provided on the side of the conductive substrate 21 facing the electrode substrate 10 and contributes to reduction of the electrolyte 50.

For example, the conductive substrate 21 is made of a corrosion resistant metal material such as titanium, nickel, platinum, molybdenum, tungsten, aluminum, stainless steel or the like. Alternatively, the substrate and the second electrode may be divided, and the conductive substrate 21 may be configured as a stacked body in which a transparent conductive layer made of a conductive oxide such as ITO, FTO or the like is formed as the second electrode on the above-described insulating transparent substrate 11. Here, when the conductive substrate 21 configured as the stacked body in which the transparent conductive layer is formed on the transparent substrate 11, the transparent conductive layer is provided on the transparent substrate 11 at least in a portion inside the sealing portion 40 in the counter substrate 20. Here, the transparent conductive layer may or may not be present between the transparent substrate 11 and the sealing portion 40 in the joining portion between the sealing portion 40 and the counter substrate 20. In addition, a thickness of the conductive substrate 21 is appropriately determined according to a size of the photoelectric conversion element 100, and is not particularly limited. However, for example, the thickness may be set to 0.005 to 4 mm.

The catalyst layer 22 is made of platinum, a carbon-based material, a conductive polymer or the like. Here, a carbon nanotube is preferably used as the carbon-based material. Incidentally, the counter electrode substrate 20 may not have the catalyst layer 22 when the conductive substrate 21 has a catalytic function (for example, when the conductive substrate contains carbon or the like).

<Oxide Semiconductor Layer>

The oxide semiconductor layer 30 is constituted by oxide semiconductor particles. The oxide semiconductor particles are constituted by, for example, titanium oxide ($TiO_2$), silicon oxide ($SiO_2$), zinc oxide (ZnO), tungsten oxide ($WO_3$), niobium oxide ($Nb_2O_5$), strontium titanate ($SrTiO_3$), tin oxide ($SnO_2$) or two or more kinds of these.

A thickness d of the main body portion 31 of the oxide semiconductor layer 30 is not particularly limited, and is typically 1 to 100 µm, preferably 2 to 40 µm, and more preferably 10 to 30 µm.

The width X2 of the second surface 30b may be longer than the width X1 of the first surface 30a. However, Y represented by the following formula (1) is preferably in a range of 2 to 25. In this case, the photoelectric conversion characteristic of the photoelectric conversion element 100 can be further improved compared to a case in which Y is out of the above range.

$$Y=(X2-X1)/2d \quad (1)$$

Here, "(X2−X1)/2" represents a protrusion amount of the protruding portion 32, which is on one side of two protruding portions 32 at both sides of the main body portion 31, from the main body portion 31 in the cross section along the thickness direction D1 of the oxide semiconductor layer 30.

Here, "(X2−X1)/2" is preferably in a range of 50 to 2,000 µm, and more preferably in a range of 100 to 700 µm.

In addition, Y is preferably in a range of 3 to 15.

<Sealing Portion>

The sealing portion 40 includes the first sealing portion 41 and the second sealing portion 42.

Examples of a material constituting the first sealing portion 41 include a resin material such as an ultraviolet curable resin and a thermoplastic resin such as a modified polyolefin resin, a vinyl alcohol polymer or the like and an inorganic material such as a glass frit. Examples of the modified polyolefin resin include an ionomer, an ethylene-vinyl acetate anhydride copolymer, an ethylene-methacrylic acid copolymer and an ethylene-vinyl alcohol copolymer. These resins may be used alone or in combination of two or more types.

Examples of a material constituting the second sealing portion 42 include a resin material such as an ultraviolet curable resin and a thermoplastic resin such as a modified polyolefin resin, a vinyl alcohol polymer or the like and an inorganic material such as a glass frit. Examples of the modified polyolefin resin include an ionomer, an ethylene-vinyl acetate anhydride copolymer, an ethylene-methacrylic acid copolymer and an ethylene-vinyl alcohol copolymer. These resins may be used alone or in combination of two or more types.

The first sealing portion 41 and the second sealing portion 42 may be made of the same material or different materials.

The first sealing portion 41 as preferably made of the inorganic material. Since the inorganic material has a coefficient of linear expansion smaller than that of the resin material, even when the temperature around the photoelectric conversion element 100 changes and the non-adhesive portion 41b repeatedly expands or contracts, a crack or the like is not likely to occur in the protruding portion 32, and the photoelectric conversion element 100 can have more excellent durability.

(Electrolyte)

The electrolyte 50 contains, a redox couple and an organic solvent. It is possible to use acetonitrile, methoxy acetonitrile, methoxy propionitrile, propionitrile, ethylene carbonate, propylene carbonate, diethyl carbonate, γ-butyrolactone, valeronitrlie, pivalonitrile, glutaronitrile, methacrylonitrile, isobutyronitrlie, phenyl acetonitrile, acrylonitrile, succinonitrile, oxalonitrile, pentanenitrile, and adiponitrile as the organic solvent. Examples of the redox couple include a redox couple such as a zinc complex, an iron complex, and a cobalt complex in addition to a redox couple containing a halogen atom such as iodide ion/polyiodide ion (for example, $I^-/I_3^-$), bromine ion/polybromide ion or the like. Incidentally, iodine ion/polyiodide ion can be formed by iodine ($I_2$) and a salt (an ionic liquid or a solid salt) containing iodide ($I^-$) as an anion. In a case of using the ionic liquid having iodide as an anion, only iodine may be added. In a case of using an organic solvent or an ionic liquid other than iodide as an anion, a salt containing iodide ($I^-$) as an anion such as bit, tetrabutylammonium iodide or the like may be added. The electrolyte 50 may use an ionic liquid instead of the organic solvent. As the ionic liquid, for example, an ordinary temperature molten salt which is a known iodine salt, such as a pyridinium salt, an imidazolium salt, or a triazolium salt, and which is in a molten state at around room temperature is used. As such an ordinary temperature molten salt, for example, 1-hexyl-3-methylimidazolium iodide, 1-ethyl-3-propylimidazolium iodide, dimethylimidazolium iodide, 1-ethyl-3-methylimidazolium iodide, 1,2-dimethyl-3-propylimidazolium iodide, 1-butyl-3-methylimidazolium iodide, or 1-methyl-propylimidazolium iodide is preferably used.

In addition, the electrolyte 50 may use a mixture of the ionic liquid above and the organic solvent above instead of the organic solvent above.

In addition, it is possible to add an additive to the electrolyte 50. Examples of the additive may include LiI, tetrabutylammonium iodide, 4-t-butylpyridine, guanidinium thiocyanate, 1-methylbenzimidazole, and 1-butylbenzimidazole.

Moreover, as the electrolyte 50, a nanocomposite gel electrolyte which is a quasi-solid electrolyte obtained by kneading nanoparticles such as $SiO_2$, $TiO_2$, and carbon nanotubes with the electrolyte above into a gel-like form may be used, or an electrolyte gelled using an organic gelling agent such as polyvinylidene fluoride, a polyethylene oxide derivative, and an amino acid derivative may also be used.

Incidentally, the electrolyte 50 contains redox couples composed of iodide ion/polyiodide ion (for example, $I^-/I_3^-$), and the concentration of polyiodide ion (for example, $I_3^-$) is preferably 0.006 mol/liter or less. In this case, since the concentration of polyiodide ion (for example, $I_3^-$) carrying electrons is low, it is possible to further reduce a leakage current. Therefore, since the open-circuit voltage can be further increased, it is possible to further improve the photoelectric conversion characteristic. Particularly, the concentration of polyiodide ion (for example, $I_3^-$) is preferably 0.005 mol/liter or less, more preferably in a range of 0 to $6 \times 10^{-6}$ mol/liter, even more preferably in a range of 0 to $6 \times 10^{-8}$ mol/liter. In this case, in a case where the dye-sensitized photoelectric conversion element 100 is seen from the light incident side of the electrode substrate 10, it is possible to make the color of the electrolyte 50 visually less noticeable.

<Dye>

As the dye, for example, a photosensitizing dye such as a ruthenium complex having a ligand including a bipyridine structure, a terpyridine structure, or the like, an organic dye such as porphyrin, eosin, rhodamine, or merocyanine; and an organic-inorganic composite dye such as a halogenated lead-based perovskite may be exemplified. As the halogenated lead-based perovskite, for example, $CH_3NH_3PbX_3$ (X=Cl, Br, I) is used.

Among the above-mentioned dyes, a photosensitizing dye composed of the ruthenium complex having a ligand including a bipyridine structure or a terpyridine structure is preferred. In this case, it is possible to more improve the photoelectric conversion characteristic of the photoelectric conversion element 100.

Incidentally, in a case where the dye is composed of the photosensitive dye, the photoelectric conversion element 100 is constituted by a dye-sensitized photoelectric conversion element, and the photoelectric conversion cell 60 is constituted by a dye-sensitized photoelectric conversion cell. Here, examples of the dye-sensitized photoelectric conversion element include a dye-sensitized photoelectric conversion element in which power generation is performed by sunlight (that is, a dye-sensitized solar cell module), and a dye-sensitized photoelectric conversion element in which power generation is performed by light other than sunlight such as an indoor lamp. In addition, examples of the dye-sensitized photoelectric conversion cell include a dye-sensitized photoelectric conversion cell in which power generation is performed by sunlight (that is, a dye-sensitized solar cell), and a dye-sensitized photoelectric conversion cell in which power generation is performed by light other than sunlight such as an indoor lamp.

Next, the method of manufacturing the above-mentioned photoelectric conversion element 100 will be described.

First, the electrode substrate 10 obtained by forming the transparent conductive layer 12 on one transparent substrate 11 is prepared.

As the method of forming the transparent conductive layer 12, a sputtering method, a vapor deposition method, a spray pyrolysis deposition method, a CVD method or the like is used.

Subsequently, the annular first sealing portion 41 is formed on the electrode substrate 10. At this time, in a case where the first sealing portion 41 is made of a resin material, the first sealing portion 41 can be formed on the electrode substrate 10 by heating and melting a sealing portion forming body. In a case where the first sealing portion 41 is made of an inorganic material, the first sealing portion 41 can be formed on the electrode substrate 10 by applying a paste containing an inorganic material onto the electrode substrate 10, and then firing the paste. At this time, the first sealing portion 41 has the adhesive portion 41a to which the second sealing portion 42 is adhered and the non-adhesive portion 41b which is provided inside the adhesive portion 41a and to which the second sealing portion 42 is not adhered. Here, the non-adhesive portion 41b is formed to have a tapered shape tapering inward from the adhesive portion 41a.

Subsequently, the oxide semiconductor layer 30 is formed inside the annular first sealing portion 41 and on the transparent conductive layer 12. The oxide semiconductor layer 30 is formed by printing an oxide semiconductor layer forming paste including oxide semiconductor particles, and then firing the oxide semiconductor layer forming paste. At this time, printing of the oxide semiconductor layer forming paste is performed such that the oxide semiconductor layer forming paste covers an entire region on the transparent conductive layer 12 and inside the first sealing portion 41 and runs on the non-adhesive portion 41b. In this way, the oxide semiconductor layer 30 has the main body portion 31 provided inside the first sealing portion 41 and on the electrode substrate 10, and the protruding portion 32 protruding outward from the main body portion 31. In addition, in the oxide semiconductor layer 30, in the cross section along the thickness direction D1 of the oxide semiconductor layer 30, the width X2 of the second surface 30b of the oxide semiconductor layer 30 facing the counter substrate 20 is longer than the width X1 of the first surface 30a which is the boundary surface between the oxide semiconductor layer 30 and the electrode substrate 10. Here, the protruding portion 32 is provided to have a tapered shape tapering away from the main body portion 31. In addition, on the surface of the electrode substrate 10, the non-adhesive portion 41b of the first sealing portion 41 and the main body portion 31 of the oxide semiconductor layer 30 come into contact with each other over the whole circumference of the main body portion 31.

The oxide semiconductor layer forming paste contains a resin such as polyethylene glycol and a solvent such as terpineol in addition to the oxide semiconductor particles.

It is possible to use, for example, a screen printing method, a doctor blading method, or a bar coating method as the printing method of the oxide semiconductor layer forming paste.

A firing temperature is in a range of 100 to 250° C. in a case where the first sealing portion 41 is made of the resin material and the oxide semiconductor layer 30 is fired and formed at a low temperature, and is in a range of 350 to 600° C. in a case where the first sealing portion 41 is made of the inorganic material. A firing time varies according to a material of the oxide semiconductor particles, and is normally 1 to 5 hours.

In this way, a working electrode on which the first sealing portion is provided is obtained.

Subsequently, the dye is adsorbed to a surface of the oxide semiconductor layer 30 of the working electrode on which the first sealing portion is provided. For this, the dye may be adsorbed on the oxide semiconductor layer 30 by immersing the working electrode in a solution containing the dye, adsorbing the dye on the oxide semiconductor layer 30, and then washing off an extra dye using a solvent component of the solution to perform drying. However, the dye may be adsorbed on the oxide semiconductor layer 30 by applying a solution containing a dye to the oxide semiconductor layer 30, and then performing drying.

Next, the electrolyte 50 is prepared.

Subsequently, the electrolyte 50 is disposed on the oxide semiconductor layer 30. For example, the electrolyte 50 can be disposed by a printing method such as screen printing.

Next, the counter substrate 20 is prepared.

On the other hand, an annular sealing portion forming body is prepared. For example, the sealing portion forming body can be obtained by preparing a resin film for sealing and forming one quadrangular opening in the resin film for sealing.

Then, the counter substrate 20 is disposed to close the opening of the sealing portion forming body, and then is bonded to the sealing portion forming body. Bonding of the counter substrate 20 to the sealing portion forming body is conducted under reduced pressure, for example.

In the manner described above, the photoelectric conversion element 100 constituted by the single photoelectric conversion cell 60 is obtained.

The invention is not limited to the above embodiment. For example, in the above embodiment, the protruding portion 32 of the oxide semiconductor layer 30 is provided to run on the non-adhesive portion 41b of the first sealing portion 41. However, the protruding portion 32 of the oxide semiconductor layer 30 may not be provided to run on the non-adhesive portion 41b of the first sealing portion 41. That is, the protruding portion 32 of the oxide semiconductor layer 30 may be provided between the non-adhesive portion 41 of the first sealing portion 41 and the counter substrate 20, and separated from the non-adhesive portion 41b of the first sealing portion 41.

Further, in the above embodiment, the first sealing portion 41 has the non-adhesive portion 41b. However, the first sealing portion 41 may not have the non-adhesive portion 41b. That is, the first sealing portion 41 may be constituted by the adhesive portion 41a only. In this case, a space is present between the protruding portion 32 and the electrode substrate 10. Here, examples of a method of setting the width X2 of the second surface 30b facing the counter substrate 20 to be longer than the width X1 of the first surface 30a in a case where the first sealing portion 41 does not have the non-adhesive portion 41b in the cross section along the thickness direction D1 of the oxide semiconductor layer 30 include a method of forming a space below the protruding portion 32 by providing a member that disappears by firing in advance inside the adhesive portion 41a of the first sealing portion 41, and printing and firing a precursor of the oxide semiconductor layer 30 on the member.

Furthermore, in the above embodiment, on the surface of the transparent conductive layer 12 of the electrode substrate 10, the non-adhesive portion 41b of the first sealing portion 41 and the main body portion 31 of the oxide semiconductor layer 30 come into contact with each other over the whole circumference of the main body portion 31. However, on the surface of the transparent conductive layer 12 of the electrode substrate 10, the non-adhesive portion 41b of the first sealing portion 41 and the main body portion 31 of the oxide semiconductor layer 30 may not come into contact with each other over the whole circumference of the main body portion 31. Specifically, a gap may be formed over the whole circumference of the main body portion 31 between the non-adhesive portion 41b of the first sealing portion 41 and the main body portion 31 of the oxide semiconductor layer 30.

Figure 3:
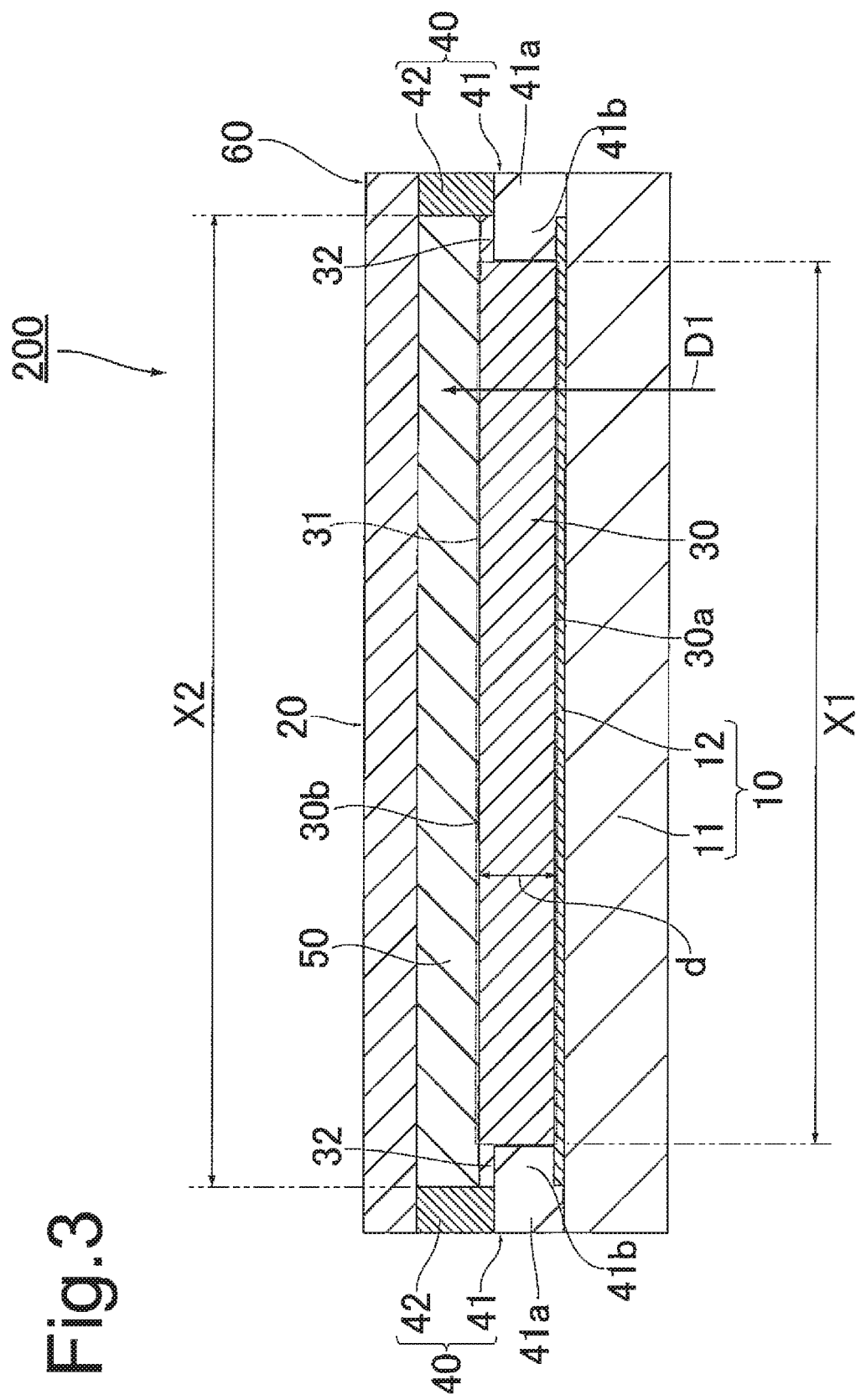
FIG. 3 is a cross-sectional view illustrating a second embodiment of a photoelectric conversion element of the present invention.

Furthermore, in the above embodiment, the protruding portion 32 has the tapered shape tapering away from the main body portion 31. However, as long as the width X2 of the second surface 30b of the oxide semiconductor layer 30 facing the counter substrate 20 is longer than the width X1 of the first surface 30a which is the boundary surface between the oxide semiconductor layer 30 and the electrode substrate 10 in the cross section along the thickness direction D1 of the oxide semiconductor layer 30, the protruding portion 32 may not have the tapered shape tapering away from the main body portion 31 in the cross section along the thickness direction D1 of the oxide semiconductor layer 30 as in a photoelectric conversion element 200 illustrated in FIG. 3. In other words, the protruding portion 32 may have a belt shape in the cross section along the thickness direction D1 of the oxide semiconductor layer 30. In this case, the non-adhesive portion 41b of the first sealing portion 41 comes into contact with an outer circumferential surface of the main body portion 31, and the protruding portion 32 is provided to run on a surface of the non-adhesive portion 41b facing the counter substrate 20.

Furthermore, in the above embodiment, a surface of the protruding portion 32 facing the counter substrate 20 is a flat surface, and corresponds with a surface obtained by extending a flat surface of the main body portion 31 facing the counter substrate 20 toward the sealing portion 40 (hereinafter referred to as an "extension surface"). As a result, the whole second surface 30b is a flat surface. However, the surface of the protruding portion 32 facing the counter substrate 20 may not correspond with the extension surface of the main body portion 31. For example, the surface of the protruding portion 32 facing the counter substrate 20 may be separated from the counter substrate 20 (extension surface) from the main body portion 31 toward the sealing portion 40. In this case as well, the second surface 30b refers to a surface obtained by projecting a surface of the oxide semiconductor layer 30 facing the counter substrate 20 on a flat surface orthogonal to the thickness direction D1 of the oxide semiconductor layer 30, that is, a surface in a case in which the oxide semiconductor layer 30 is viewed in the thickness direction D1 of the oxide semiconductor layer 30. For this reason, a width of the second surface 30b is the same as the width X2 of the second surface 30b in a case in which the whole second surface 30b is a flat surface.

Figure 4:
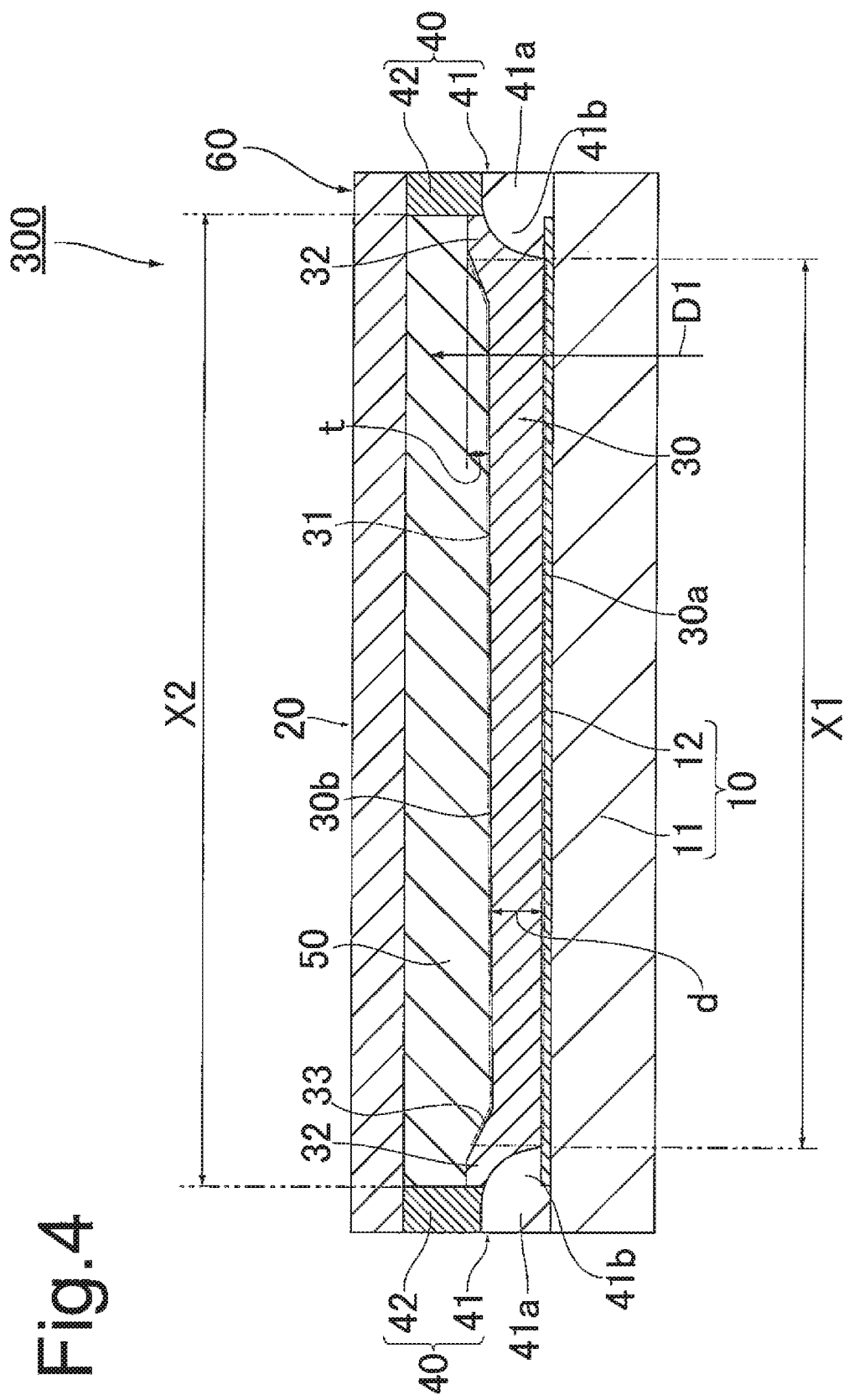
FIG. 4 is a sectional view illustrating a third embodiment of a photoelectric conversion element of the present invention.

Furthermore, in the above embodiment, the whole second surface 30b which is the surface of the oxide semiconductor layer 30 facing the counter substrate 20 is a flat surface. However, a depression 33 may be formed on the surface of the oxide semiconductor layer facing the counter substrate 20 as in a photoelectric conversion element 300 illustrated in FIG. 4. In this case as well, the second surface 30b refers to the surface obtained by projecting the surface of the oxide semiconductor layer 30 facing the counter substrate 20 on the flat surface orthogonal to the thickness direction D1 of the oxide semiconductor layer 30, that is, the surface in a case in which the oxide semiconductor layer 30 is viewed in the thickness direction D1 of the oxide semiconductor layer 30. For this reason, the width of the second surface 30b is the same as the width of the second surface 30b in a case in which the whole second surface 30b is a flat surface.

When the depression 33 is formed in a side of the oxide semiconductor layer 30 facing the counter substrate 20, a surface area of the surface of the oxide semiconductor layer 30 facing the counter substrate 20 increases more compared to a case in which the depression 33 is not formed. As a result, it is possible to capture more light that enters from the electrode substrate 10, passes through the oxide semiconductor layer 30, and is reflected on the counter substrate 20, and thus the photoelectric conversion characteristic of the photoelectric conversion element 300 can be further improved.

A maximum depth t of the depression 33 is not particularly limited, and is preferably in a range of 1 to 50 μm. In this case, it is possible to increase utilization efficiency of light while shortening an inter-electrode distance (a distance between the electrode substrate and the counter substrate) compared to a case in which the maximum depth t of the depression 33 is out of the above range. For this reason, the photoelectric conversion characteristic of the photoelectric conversion element 300 can be further improved. In addition, uniformity of the inter-electrode distance (the distance between the electrode substrate 10 and the counter substrate 20) is further enhanced. The maximum depth t of the depression 33 is more preferably in a range of 3 to 30 μm.

Furthermore, in the above embodiments, a light reflection layer that reflects light emitted from the oxide semiconductor layer 30 and returns the light to the oxide semiconductor layer 30 may be provided on the whole second surface 30b which is the surface of the oxide semiconductor layer 30 facing the counter substrate 20. In this case, a step is formed on the second surface 30b. However, even in this case, the second surface 30b refers to the surface obtained by projecting the surface of the oxide semiconductor layer 30 facing the counter substrate 20 on the flat surface orthogonal to the thickness direction D1 of the oxide semiconductor layer 30, that is, the surface in a case in which the oxide semiconductor layer 30 is viewed in the thickness direction D1 of the oxide semiconductor layer 30. For this reason, the width X2 of the second surface 30b is the same as the width of the second surface 30b in a case in which the whole second surface 30b is a flat surface.

Furthermore, in the above embodiment, the peripheral portion of the transparent conductive layer 12 is interposed between the sealing, portion 40 and the transparent substrate 11. However, the peripheral portion of the transparent conductive layer 12 may not be interposed between the sealing portion 40 and the transparent substrate 11 except for the power extraction portion.

In addition, in the above embodiments, the photoelectric conversion elements 100 to 300 are constituted by the single photoelectric conversion cell 60. However, the photoelectric conversion element may comprise a plurality of photoelectric conversion cells 60.

Furthermore, in the above embodiments, the counter substrate 20 is constituted by the electrode substrate. However, the counter substrate 20 may include an, insulating substrate. In this case, the oxide semiconductor layer 30, a porous insulating layer impregnated with the electrolyte 50, and a counter electrode are sequentially provided on the electrode substrate 10. Here, the porous insulating layer may be provided around the oxide semiconductor layer 30 and provided between the electrode substrate 10 and the counter electrode.

EXAMPLES

Hereinafter, the content of the invention will be more specifically described with examples. However, the present invention is not limited to the following examples.

Example 1

First, a transparent conductive substrate obtained by forming a transparent conductive layer made of FTO having a thickness of 1 μm on a transparent substrate having thickness of 1 mm and made of glass was prepared as an electrode substrate.

Subsequently, an annular first sealing portion having a width of 2.0 mm and a maximum thickness of 10 μm was formed on the electrode substrate. At this time, the first sealing portion was formed on the electrode substrate by applying a glass paste containing a glass frit onto the electrode substrate, and then firing the glass paste. At this time, the first sealing portion was constituted by an adhesive portion to which a second sealing portion is adhered and a non-adhesive portion which is provided inside the adhesive portion and to which the second sealing portion is not adhered. In addition, the non-adhesive portion was formed to have a shape tapering away from the adhesive portion.

Subsequently, an oxide semiconductor layer was formed on the transparent conductive layer and inside the annular first sealing portion. The oxide semiconductor layer was formed by screen-printing an oxide semiconductor layer forming paste that contains oxide semiconductor particles, and then firing the oxide semiconductor layer forming paste. At this time, printing of the oxide semiconductor layer forming paste was performed such that the oxide semiconductor layer forming paste covered a whole region on the transparent conductive layer and inside the first sealing portion and runs on the non-adhesive portion. In addition, firing was performed at 500° C. for an hour. In this way, the oxide semiconductor layer including a main body portion provided inside the first sealing portion and on the electrode substrate and a protruding portion protruding outward from the main body portion was obtained. Here, the main body portion was provided to extend straight in a direction away from the electrode substrate, and a thickness d of the main body portion was 20 μm. In addition, the protruding portion had a tapered shape tapering away from the main body portion. Further, the non-adhesive portion of the first sealing portion and the main body portion of the oxide semiconductor layer came into contact with each other over the whole circumference of the main body portion on a surface of the transparent conductive layer of the electrode substrate. That is, a gap between the main body portion and the non-adhesive portion of the first sealing portion was 0 mm on the surface of the transparent conductive layer of the electrode substrate. In this way, a working electrode having the first sealing portion thereon was obtained.

Subsequently, the working electrode having the first sealing portion thereon was immersed in a photosensitive dye solution one day and night and then taken out and dried, and a photosensitive dye was adsorbed to the oxide semiconductor layer. The photosensitive dye solution was prepared by dissolving a photosensitive dye consisting of Z907 in a mixed solvent in which acetonitrile and t-butanol were mixed at a volume ratio of 1:1 so that concentration thereof became 0.2 mM.

Subsequently, an electrolyte was applied onto the oxide semiconductor layer. A 3-methoxyoropionitrile (MPN) solution containing 0.002 M of iodine and 0.6 M of 1,2-dimethyl-3-propylimidazolium iodide (DMPImI) was prepared as the electrolyte.

Subsequently, a counter electrode serving as a counter substrate was prepared. The counter electrode was prepared by forming a catalyst layer made of platinum and having a thickness of 5 nm on a titanium foil having a size of 5 cm×5 cm×40 μm by a sputtering method.

On the other hand, a sealing portion forming body for forming a sealing portion was prepared. The sealing portion forming body was obtained by preparing one resin film for sealing made of Bynel 14164 (trade name, manufactured by Du Pont) and having a size of 5 cm×5 cm×50 μm, and forming a quadrangular opening in the resin film for sealing. At this time, the opening was formed to have a size of 4.82 cm×4.82 cm×50 μm.

Then, this sealing portion formation body was adhered to the counter electrode by heating and melting on a surface of the counter electrode facing the working electrode.

Then, the first sealing portion formed on the working electrode and the sealing portion forming body adhered to the counter electrode were opposed and superposed on each other. Then, the sealing portion forming body was heated and melted while being pressurized under a reduced pressure. In this way, the second sealing portion was formed on the adhesive portion of the first sealing portion, and the sealing portion was formed between the working electrode and the counter electrode. In addition, a protruding portion of the oxide semiconductor layer was provided with a width of 0.15 mm between the non-adhesive portion of the first sealing portion and the counter electrode and was in contact with the second sealing portion. That is, the protruding portion was provided between the non-adhesive portion of the first sealing portion and the counter electrode such that a protrusion amount from the main body portion of the oxide semiconductor layer was 0.15 mm, and the protruding portion came into contact with the second sealing portion.

In the manner described above, a photoelectric conversion element including one photoelectric conversion cell was obtained. Incidentally, in the obtained photoelectric conversion element, a width X2 of a second surface of the oxide semiconductor layer facing the counter substrate was longer than a width X1 of a first surface which was a boundary surface between the oxide semiconductor layer and the electrode substrate by 0.3 mm in a cross section along a thickness direction D1 of the oxide semiconductor layer. That is, a value of Y represented by the above formula (1) was 7.5.

Example 2

A photoelectric conversion element was obtained in the same manner as in Example 1 except that the protruding portion did not have a tapered shape tapering in a direction away from the main body port ion, and cross-sectional shape of the protruding portion was a belt shape having a width of 0.15 mm.

Example 3

A photoelectric conversion element was obtained in the same manner as in Example 1 except that the gap between the main body portion and the non-adhesive portion of the first sealing portion was set to 0.15 mm from 0 mm on the surface of the transparent conductive layer of the electrode substrate.

Comparative Example 1

A photoelectric conversion element was obtained in the same manner as in Example 1 except that the oxide semiconductor layer was formed such that the protruding portion protruding from the main body portion was not included (that is, the width X1 of the first surface which was the boundary surface between the oxide semiconductor layer and the electrode substrate was the same as the width X2 of the second surface of the oxide semiconductor layer facing the counter substrate in the cross section along the thickness direction D1 of the oxide semiconductor layer).

Comparative Example 2

A photoelectric conversion element was obtained in the same manner as in Example 1 except that the oxide semiconductor layer was formed such that the protruding portion protruding from the main body portion was not included (that is, the width X1 of the first surface which was the boundary surface between the oxide semiconductor layer and the electrode substrate was the same as the width X2 of the second surface of the oxide semiconductor layer facing the counter substrate in the cross section along the thickness direction D1 of the oxide semiconductor layer), and the gap between the main body portion and the non-adhesive portion of the first sealing portion was set to 0.15 mm from 0 mm on the surface of the transparent conductive layer of the electrode substrate.

<Evaluation of Characteristic>
(Photoelectric Conversion Characteristic)

With regard to the photoelectric conversion elements of Examples 1 to 5 and Comparative Examples 1 and 2 obtained as described above, photoelectric conversion efficiency was measured by performing I-V measurement under simulated sunlight (power density 100 mW/cm$^2$, AM 1.5), and improvement rate (%) of the photoelectric conversion efficiency η1 based on Comparative Example 1 was calculated based on the following formula. Results are shown in Table 1.

Improvement rate (%) of η1=100×(η1 of Example-η1 of Comparative Example 1)/η1 of Comparative Example 1

In addition, with regard to the pilot electric conversion elements of Examples 1 to and Comparative Examples 1 and 2, photoelectric conversion efficiency η2 was measured by performing I-V measurement under a low illuminance of 200 lux using a white LED as a light source, and improvement rate (%) of the photoelectric conversion efficiency η2 based on Comparative Example 1 was calculated based on the following formula. Results are shown in Table 1.

Improvement rate (%) of η2=100×(η2 of Example-η2 of Comparative Example 1)/η2 of Comparative Example 1

From the above, it was confirmed that the photoelectric conversion characteristic can be improved according to the photoelectric conversion element of the present invention.

EXPLANATIONS OF REFERENCE NUMERALS

10 . . . electrode substrate
20 . . . counter substrate
21 . . . conductive substrate (electrode)
30 . . . oxide semiconductor layer
30$a$ . . . first surface
30$b$ . . . second surface
31 . . . main body portion
32 . . . protruding portion
33 . . . depression
40 . . . sealing portion
41 . . . first sealing portion
41$a$ . . . adhesive portion
41$b$ . . . non-adhesive portion
42 . . . second sealing portion
50 . . . electrolyte
60 . . . photoelectric conversion cell
100, 200, 300 . . . photoelectric conversion element
X1 . . . width of first surface
X2 . . . width of second surface
D1 . . . thickness direction of oxide semiconductor layer
D2 . . . thickness direction of first sealing portion
t . . . maximum depth of depression
d . . . thickness of main body portion of oxide semiconductor layer

The invention claimed is:

1. A photoelectric conversion element comprising at least one photoelectric conversion cell,
wherein the photoelectric conversion cell includes
an electrode substrate, the electrode substrate comprising a first electrode,
a counter substrate facing the electrode substrate, the counter substrate comprising a second electrode,
an oxide semiconductor layer provided on the electrode substrate,

TABLE 1

| | Oxide semiconductor layer | | | Photoelectric conversion characteristic | |
|---|---|---|---|---|---|
| | | | | Under simulated sunlight | Under low illuminance |
| | Presence/absence of protruding portion | Cross-sectional shape of protruding portion | Gap between main body portion and first sealing portion (mm) | Improvement rate of η1 (%) | Improvement rate of η2 (%) |
| Example 1 | Present | Tapered shape | 0 | 5.3 | 9.4 |
| Example 2 | Present | Belt shape | 0 | 3.0 | 5.8 |
| Example 3 | Present | Tapered shape | 0.15 | 4.1 | 8.4 |
| Comparative Example 1 | Absent | — | 0 | — | — |
| Comparative Example 2 | Absent | — | 0.15 | −3.0 | −2.9 |

From the results shown in Table 1, it was found that the photoelectric conversion elements of Examples 1 to 3 can improve the photoelectric conversion characteristic more than the photoelectric conversion elements of Comparative Examples 1 and 2.

an electrolyte provided between the electrode substrate and the counter substrate, and
an annular sealing portion joining the electrode substrate and the counter substrate together,
the oxide semiconductor layer includes a main body portion provided inside the sealing portion and on the electrode substrate and extending straight from the electrode substrate toward the counter substrate, and a protruding portion which protrudes from the main body portion toward the sealing portion and does not come into contact with the electrode substrate, and a width of a second surface of the oxide semiconductor layer facing the counter substrate is longer than a width of a first surface which is a boundary surface between the oxide semiconductor layer and the electrode substrate in a cross section along a thickness direction of the oxide semiconductor layer;

wherein the protruding portion has a tapered shape tapering away from the main body portion in the cross section along the thickness direction of the oxide semiconductor layer.

2. The photoelectric conversion element according to claim 1, wherein Y represented by the following formula (1) is in a range of 2 to 25:

$$Y=(X2-X1)/2d \quad (1)$$

(In the above formula (1), X1 denotes the width (unit is μm) of the first surface, X2 denotes the width (unit is μm) of the second surface, and d denotes a thickness (unit is μm) of the oxide semiconductor layer in the main body portion).

3. The photoelectric conversion element according to claim 1, wherein the sealing portion includes an annular first sealing portion provided on the electrode substrate, and an annular second sealing portion joining the first sealing portion and the counter substrate together, the first sealing portion includes an adhesive portion adhered to the second sealing portion and a non-adhesive portion which is not adhered to the second sealing portion and protrudes inward from the second sealing portion, and the protruding portion of the oxide semiconductor layer is provided between the counter substrate and the non-adhesive portion of the first sealing portion.

4. The photoelectric conversion element according to claim 3, wherein the protruding portion of the oxide semiconductor layer is provided to run on the non-adhesive portion of the first sealing portion.

5. The photoelectric conversion element according to claim 3, wherein the non-adhesive portion of the first sealing portion has a tapered shape tapering from the adhesive portion toward the oxide semiconductor layer in a cross section along a thickness direction of the first sealing portion.

6. The photoelectric conversion element according to claim 3, wherein the non-adhesive portion of the first sealing portion and the main body portion of the oxide semiconductor layer come into contact with each other over a whole circumference of the main body portion on a surface of the electrode substrate.

7. The photoelectric conversion element according to claim 1, wherein a depression is formed on a side of the oxide semiconductor layer facing the counter substrate.

8. The photoelectric conversion element according to claim 7, wherein a maximum depth of the depression is in a range of 1 to 50 μm.

9. The photoelectric conversion element according to claim 1, wherein the counter substrate includes a catalyst layer.

* * * * *